US006763112B1

(12) United States Patent
Haumont

(10) Patent No.: US 6,763,112 B1
(45) Date of Patent: Jul. 13, 2004

(54) SECURITY PROCEDURE IN UNIVERSAL MOBILE TELEPHONE SERVICE

(75) Inventor: Serge Haumont, Helsinki (FI)

(73) Assignee: Nokia Networks Oy, Keilalahdentie (FI)

(*) Notice: Subject to any disclaimer, the term of this patent is extended or adjusted under 35 U.S.C. 154(b) by 0 days.

(21) Appl. No.: 09/406,377

(22) Filed: Sep. 28, 1999

(51) Int. Cl.[7] .............................................. H04K 1/00
(52) U.S. Cl. .................................... 380/247; 380/270
(58) Field of Search ..................... 380/249; 379/142.05, 379/913, 55.1; 455/3.01–3.06; 340/5.8

(56) References Cited

U.S. PATENT DOCUMENTS

| 5,241,598 | A | * | 8/1993 | Raith | 380/248 |
| 5,544,224 | A | * | 8/1996 | Jonsson et al. | 455/434 |
| 5,551,073 | A | * | 8/1996 | Sammarco | 455/411 |
| 6,137,791 | A | * | 10/2000 | Frid et al. | 370/352 |
| 6,339,705 | B1 | * | 1/2002 | Pehrson | 455/419 |

OTHER PUBLICATIONS

"Digital cellular telecommunications system (Phase 2+); Mobile radio interface layer 3 specification (GSM 04.08 version 6.3.1 Release 1997)", ETSI, EN 300 940 V6.3.1 (Aug. 1, 1999), European Standard (Telecommunications series).

"Digital cellular telecommunications system (Phase 2+); Security related network functions (GSM 03.20 version 6.1.0 Release 1997)", ETSI, TS 100 929 V6.1.0 (Jul. 1, 1999), Technical Specification.

"Mobility and Security Management", The GSM System, Europe Media, pp. 432–498.

* cited by examiner

Primary Examiner—Gregory Morse
Assistant Examiner—Christopher J. Brown
(74) Attorney, Agent, or Firm—Cohen, Pontani, Lieberman & Pavane

(57) ABSTRACT

A security procedure for a Universal Mobile Telephone Service (UMTS) mobile communication system includes detecting a communication failure between a Radio Network Controller (RNC) which controls radio coverage within a prescribed geographical area and a Mobile Station (MS) in the geographic area, authenticating the MS and setting a new security parameter in response to the communication failure. The security parameter to be changed may be a ciphering key CK or an integrity key IK. Moreover, the steps of authenticating and setting a new security parameter may be performed separately or simultaneously.

43 Claims, 5 Drawing Sheets

SECURITY PROCEDURE IN UNIVERSAL MOBILE TELEPHONE SERVICE

BACKGROUND OF THE INVENTION

1. Field of the Invention

The present invention relates to a security procedure for use with a Universal Mobile Telephone Service (UMTS), the security procedure being performed in response to a detection of a communication failure between a Mobile Station (MS) and a Radio Network Controller (RNC) related to security such as a failure of an integrity check or a ciphering failure.

2. Description of the Related Art

A Universal Mobile Telephone Service (UMTS) is a network platform for a third-generation mobile communication system which aims to deliver seamless services for a subscriber and is usable across many networks. In general, the UMTS system includes a Core Network (CN) connected to a plurality of Universal Radio Access Networks (URANs). The CN comprises two parts: a first part adapted for circuit switch traffic (e.g. a Mobile Switching Center (MSC) and Visiting Location Register (VLR)) and a second part adapted for packet switch traffic (e.g. a Serving GPRS Support Node (SGSN)). Each URAN provides radio coverage over a prescribed geographical area referred to as a URAN Area (URA). To provide this coverage, each URAN includes a Radio Network Controller (RNC) which controls at least one Base Station (BS). The RNC is interconnected with other RNCs to perform switching operations and mobility management. The CN is connectable to all other types of networks to provide the subscriber with seamless services.

The movement of an MS from one URA (called an old URA) to a new URA initiates a URA update performed by the RNC of the new URA so that the MS can be reached when required. It is in the interest of the network operator to ensure that the MS initiating the URA update is a valid user. The validation involves the RNC performing an integrity check which is an authentication of the packet transmission between the RNC and the MS.

Each MS (which is also referred to as UMTS Equipment (UE)) includes a Subscriber Identity Module (SIM) card containing databases and executable files. The SIM card contains in its databases an International Mobile Subscriber Identity (IMSI), location information pertaining to the present location of the MS, an integrity key IK, and other security and administrative information. The location information is updated on the SIM card after each call termination, when the handset is properly deactivated, and when the MS moves from one URA to another. The location information includes a temporary anonymous identification used within each URA which may be known as the Temporary Mobile Subscriber Identity (TMSI), Packet TMSI (PTMSI), or Radio Network Temporary Identification (RNTI). The TMSI or other temporary identification is used as a security measure to provide an anonymous identity instead of using the IMSI which identifies the specific MS. As a further security measure, the communications between the MS and the URAN are encrypted using an encryption key. The encryption key is usually a ciphering key CK which is stored in an Authentication Center (AuC) or a Home Location Register (HLR).

The prior art integrity check in a UMTS System will now be described with reference to FIG. 5. The integrity check is initiated when the MS initiates the establishment of a Radio Resource Connection (RRC) by sending a COUNT parameter to the RNC, step 1. The COUNT is a time dependent value that is incremented at both sides of the radio link every 10 ms. A user stores the last used COUNT parameter and increments it by one to ensure that no COUNT value is reused (by the network) with the same integrity key IK.

The RNC stores the received COUNT parameter, step 2. The MS then transmits an Initial L3 Message such, for example, as a Location update request, a Communications Management (CM) service request, or a Routing Area Update Request to the relevant CN, step 3. The Initial L3 Message will contain relevant mobility management (MM) information, MS identity using, for example, a temporary identification as described above, an MS classmark IE, which includes information on the UMTS Integrity Algorithms (UIAs) and the UMTS Encryption Algorithms (UEAs) supported by the MS, and a Key Set Identifier (KSI) which is the number allocated by the CN at the last authentication for this CN domain.

After the MS has transferred all this information, an authentication of the packet and generation of new security keys such as the integrity key IK and the ciphering key CK may be performed, step 4. A new KSI will then also be allocated. Therefore the authentication procedure is used to change IK and CK, in addition to authenticate the information packet transmitted by the user.

To perform the packet authentication, the CN selects UIAs and UEAs that are allowed to be used. The CN initiates the integrity check (and possible also a ciphering update) by sending a RANAP message "Security Mode Command" to the RNC, step 6. This message includes the allowed UIAs and the IK to be used. It may also contain the allowed UEAs and the CK to be used if a ciphering update is required. This message also includes the UE classmark IE which is transmitted transparently to the MS through the RNC.

The RNC determines which of the allowed UIAs and UEAs to use, generates a random value FRESH and initiates the downlink integrity protection, step 7. The RNC then generates the RRC message "Security Control Command" including a random challenge RAND and an authentication token for network authentication AUTN. This message also includes the UE classmark IE, the UIA and the random value FRESH. The UEA to be used and additional information related to start of ciphering may also be included if a ciphering update is being performed. At this point there are two CNs, each with its own IK. Accordingly, the network must indicate which IK to use. This is accomplished by including a CN type indicator information in the "Security Control Command" message. Before sending the "Security Control Command" message to the MS, the RNC generates a MAC-I (Message Authentication Code for Integrity) and attaches this information to the message.

Upon receiving the "Security Control Command" message including the RAND AUTN with the MAC-I, the MS verifies that the UE classmark IE received from the RNC is equal to the UE classmark IE sent in the initial L3 message and then computes a XMAC-I based on the message received by using the indicated UIA, the stored COUNT and the received FRESH parameter. The UE then verifies the data integrity of the message by comparing the received MAC-I with the generated XMAC-I, step 9.

If step 9 is successful, the MS computes a "Security Control Response" (RES) of the RRC message and generates a second MAC-I for this message. The MS then transmits the "Security Control Response" with the second MAC-I to the RNC, step 10.

Upon receipt of the RES message, the RNC computes a second XMAC-I based on the RES as an input to the UIA. The RNC then verifies the data integrity of the message by comparing the received second MAC-I with the generated second XMAC-I, step 11. When the data integrity is verified at step 11, the RNC transmits a RANAP "Security Mode Complete" message to the CN to end the integrity procedure, step 12.

The "Security Mode Command" in step 6 to MS starts the downlink integrity protection, i.e. all following messages sent to the MS are integrity protected. The "Security Control Response" transmitted by the MS starts the uplink Integrity protection, i.e. all following messages sent from the MS are integrity protected.

If a communication failure occurs because the above described integrity check fails or because the deciphering fails, the RNC does not know what to do (as it can not perform the authentication procedure of the MS) and the MS will be disconnected. One of the reasons this may occur is that the ciphering key CK or the integrity key IK of a valid MS does not match the ciphering key or integrity key IK stored in the RNC. This situation also presents itself if a radio link is disrupted and restarted in which case the RNC or the MS, for security reasons, is prevented from communicating with the old ciphering key CK or integrity key IK. Since the MS is not automatically updated in this case, there is a mismatch. It is important to note that if the RNC merely releases the connection in case of (repeated) integrity check failures, a malicious user could cause a dropped connection of a valid user by sending a false packet. Accordingly, a security procedure is required for use with UMTS so that a valid MS may access the system in the above situations.

SUMMARY OF THE INVENTION

It is an object of the present invention to provide a security procedure for use with a Universal Mobile Telephone Service (UMTS) for triggering the authentication of a Mobile Station (MS) and/or the generation of a new integrity key (IK) and/or a new ciphering key (CK) by the Core Network (CN) in response to a communication failure detected by a Radio Network Controller (RNC) of a Universal Radio Access Network (URAN).

This object is achieved by a security procedure for use with a UMTS communication system having a Core Network (CN) connected to a plurality of URANs respectively providing radio coverage over URAN Areas (URAs). Each of the plural URANs has an RNC and a Base Station (BS). The security procedure is initiated when the RNC detects a communication failure between an MS and the RNC. The RNC then determines whether the detected communication failure requires MS authentication. If authentication is required, the CN performs an authentication procedure between the CN and the MS to authenticate the MS and optionally changes the integrity key IK and the ciphering key CK.

The object is also achieved by a security procedure for use with a UMTS communication system having a CN connected to a plurality of URANs respectively providing radio coverage over URAs. Each of the plural URANs has a RNC and a BS. The security procedure comprises the steps of detecting, by an RNC, of a communication failure between an MS and the RNC. The RNC then transmits a request to the CN to perform an authentication of the MS. The request preferably contains a cause parameter describing the failure (i.e., "integrity check failure"). The CN performs the authentication of the MS after the CN receives the request from the RNC.

If the authentication of the MS fails, the CN indicates it to the RNC. If the authentication succeeds, the CN indicates the new security parameters to the RNC, for example, using the "Security Mode Command" message. Further, the CN may use the authentication procedure to modify other security parameters. For example, in response to an "integrity check fail", the CN may modify the UMTS Integrity Algorithm (UIA).

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Universal Mobile Telephone Service (UMTS) is a network platform for third generation mobile systems which aims to provide a seamless connection for subscribers to various services and is usable across many networks. The various networks may, for example, include mobile telephone services, short text message services such as for pagers and mobile phones, General Packet Radio Services (GPRS), and other data services such as internet access services, e-mail services, facsimile transmissions, and services for accessing remote computers.

Figure 1:
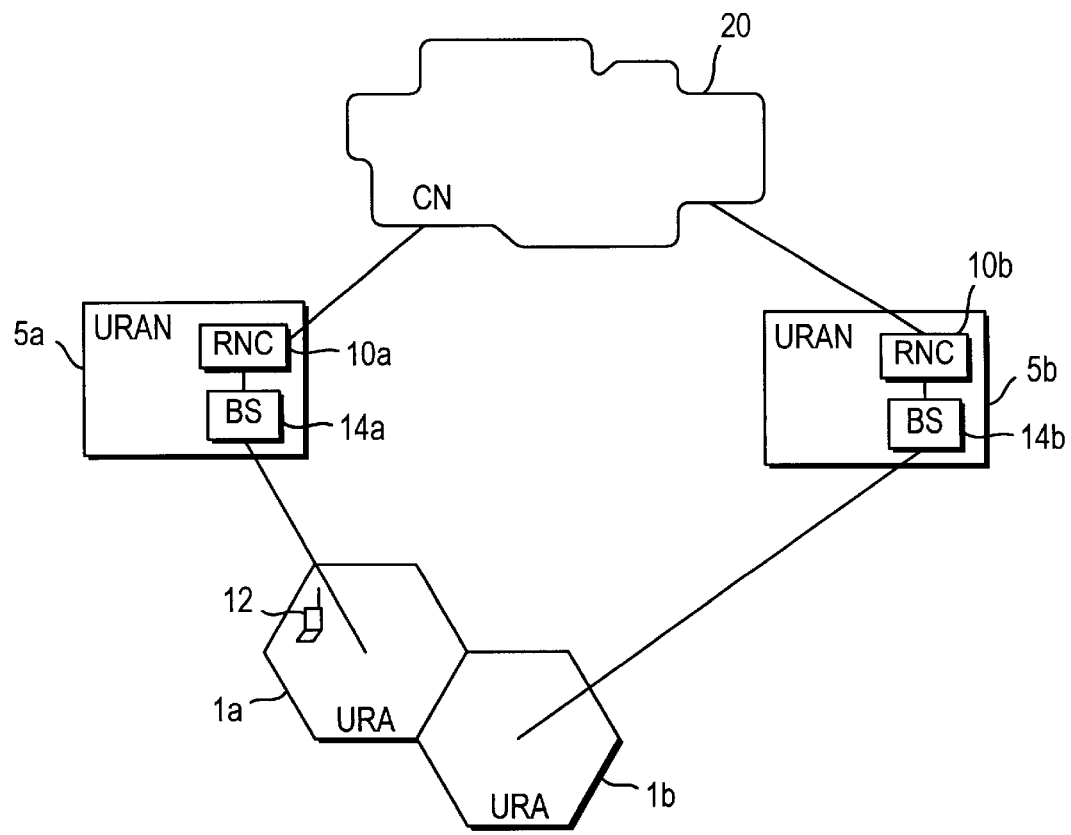
FIG. 1 is a schematic diagram showing the basic portion of a UMTS.

FIG. 1 shows a core network 20 connected to a first Universal Radio Access Network (URAN) 5a and a second URAN 5b. The first and second URANs 5a, 5b respectively provide radio related access between URAN Areas (URAs) 1a, 1b and the core network 20. First URAN 5a includes a first Radio Network Controller (RNC) 10a and a first Base Stations (BS) 14a which monitors the movement of a Mobile Station (MS) 12 within the associated URA 1a. An MS may, for example, comprise a mobile telephone, a pager, a computer, or other similar device capable of receiving a signal from a URAN. The second URAN includes a second RNC 10b and a second BS 14b to monitor the second URA 1b. The RNCs 10a, 10b are respectively connected for controlling the BSs 14a, 14b. In general, an RNC may be connected to more than one BS and each URAN may have more than one RNC. The URANs 5a, 5b monitor the mobility of the MS 12 and manage the resources necessary to deliver an incoming call or message to the MS 12 in any of the URAs 1a, 1b or to connect the MS 12 to a desired service or network.

When an MS moves from one URA to another such as, for example, from the first (old) URA 1a to the second (new)

URA 1b, a URA update must be performed by the RNC 10b in the new URAN 5b so that the new URAN 5b and core network 20 have the proper information required to support the above functions required for the MS 12. To ensure that the MS 12 initiating the URA update is valid, the RNC 10b of the new URAN 5b performs an integrity check.

A security procedure according to the present invention is performed in response to a communication failure such as, for example, if this integrity check fails. The communication failure may be the result of a mismatch between the security signature supplied by the MS and the signature that the RNC received from the old RNC or may result if the RNC does not understand the MS—i.e. if there is a difference in the encryption keys (the ciphering keys and/or integrity keys). The integrity check may fail repeatedly, thereby causing repeated communication failures if the new RNC does not support the UMTS Integrity Algorithm (UIA) and/or the UMTS Encryption Algorithm (UEA) used by the previous RNC, thus making it unable to communicate with the MS. Furthermore, the security procedure may also be performed independent of a movement of an MS from one URA to another. For example, the communication failure may comprise a disruption in a radio link between an RNC and an MS. If the radio link between an RNC and an MS is disrupted and restarted, the RNC may be prevented from using the old encryption key for security reasons. Furthermore, the communication failure may also occur during a periodic authentication performed between the RNC and the MS during long data transfers (such as a call where user data are not security checked) in which the RNC transmits an authentication request containing only an integrity check field as a light security procedure.

Figure 2:
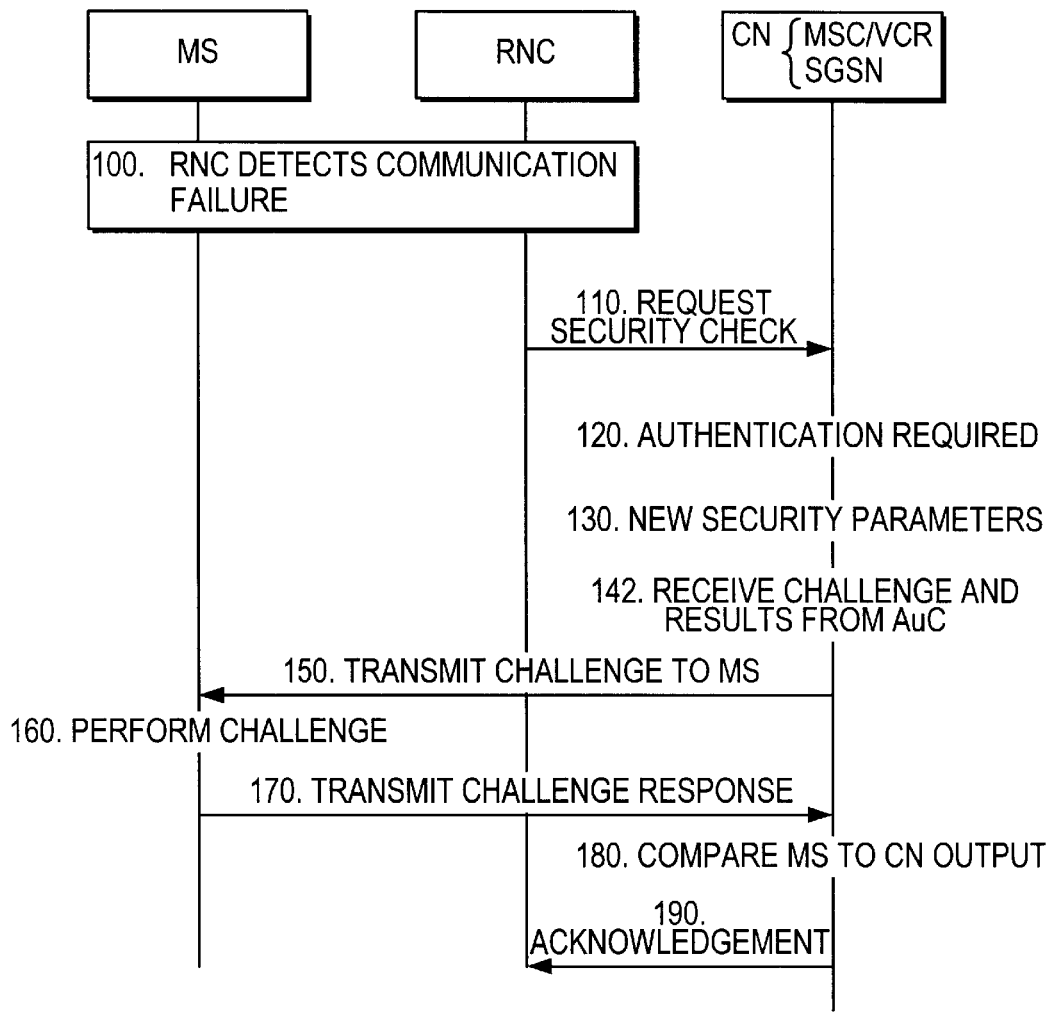
FIG. 2 is a signal flow diagram of the security procedure according to an embodiment of the invention.
Figure 3:
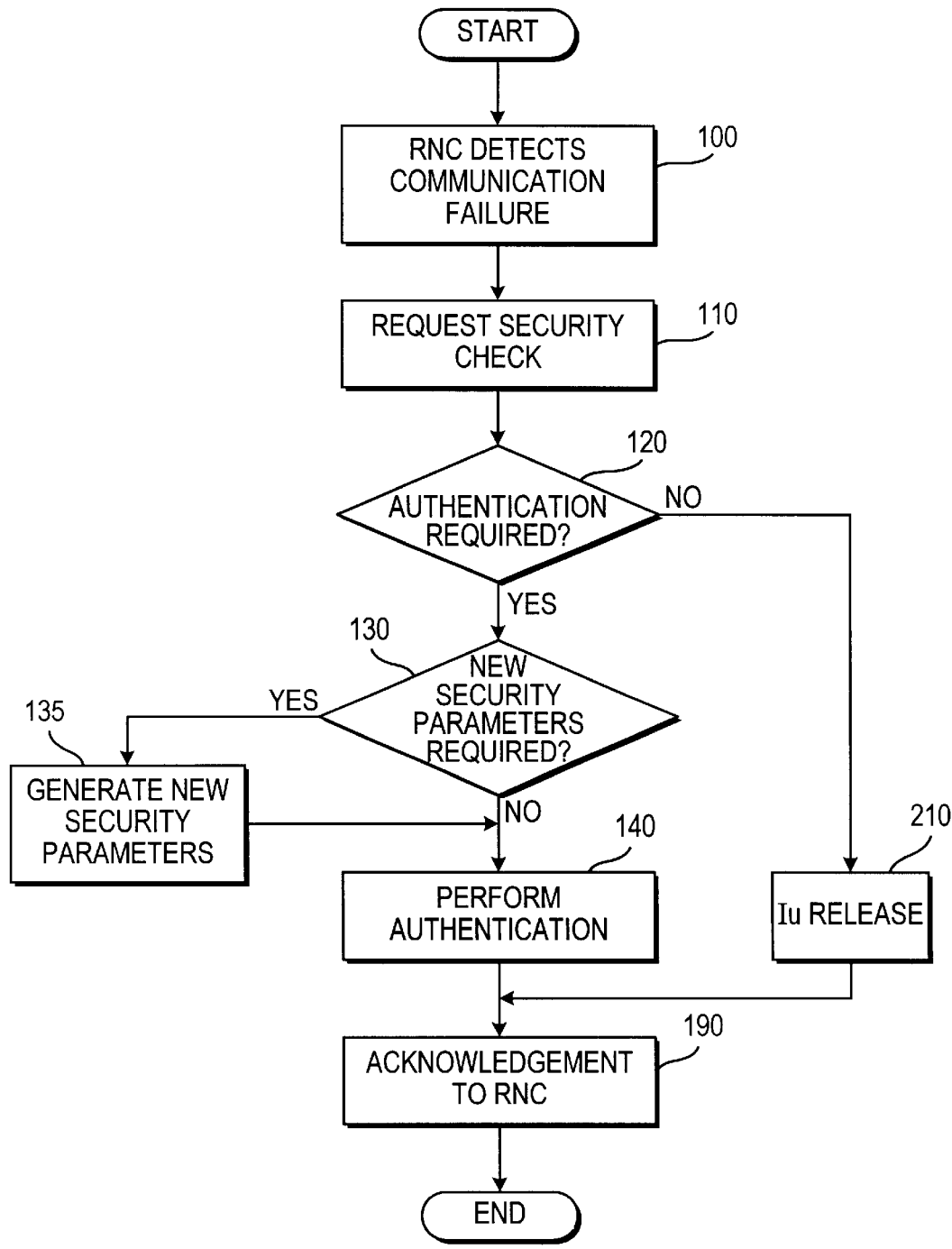
FIG. 3 is a flow diagram of the security procedure according to an embodiment of the present invention.

Referring to FIGS. 2 and 3, the inventive procedure initiates at step 100 when the RNC of the new URAN detects the communication failure. The communication failure (i.e., integrity check failure) may occur first in the RNC or the MS. If the communication failure occurs in the MS, the MS informs the RNC and the RNC detects the failure. However, the RNC may use a specific cause such as "MS failure" to report this failure to the CN. After detecting the communication failure, the RNC determines the type of communication failure and transmits a communication failure message to the CN including an indication of the cause along with a request for the CN to perform a security check according to the present invention, step 110. The CN then determines whether an authentication of the MS is required, step 120. An authentication may not be required if the failure is a persistent failure. For example, if an authentication of the MS was recently successfully performed such as within a predetermined time frame and the failure persists, the solution is to disconnect the MS, step 210. In an alternative embodiment, the procedure may skip step 120 and automatically perform the authentication each time a security is requested in step 110.

The CN determines from the cause of the communication failure, whether a new security parameter, such as a new authentication vector key is required, step 130. If it is determined in step 130 that a new security parameter is required, the CN will supply the authentication vector keys (i.e., the integrity key IK and/or the ciphering key CK) during step 130 from a storage of unused authentication vector keys. If the CN has no more unused authentication vector keys, the CN may then request new authentication vector keys from the Authentication Center (AuC) or HLR. Furthermore, the CN may determine from the cause of the communication failure that the RNC is unable to support the UIA or UEA used by the MS. If this is the case, the CN may choose a new allowed UIA and/or UEA and transmit the same to the RNC in the Security Mode Command.

Figure 4:
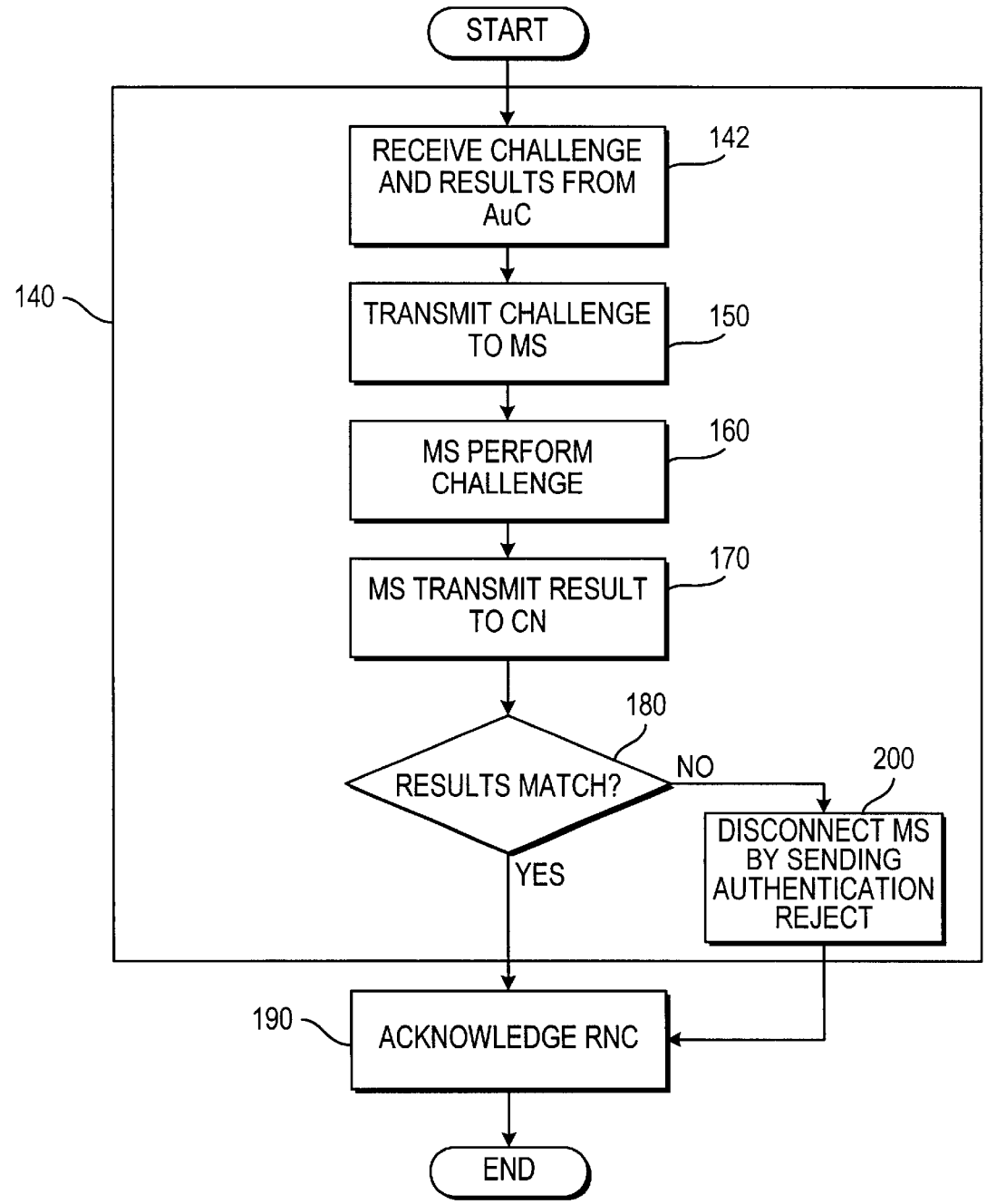
FIG. 4 is a flow diagram of the authentication portion of the security procedure of FIG. 2.
Figure 5:
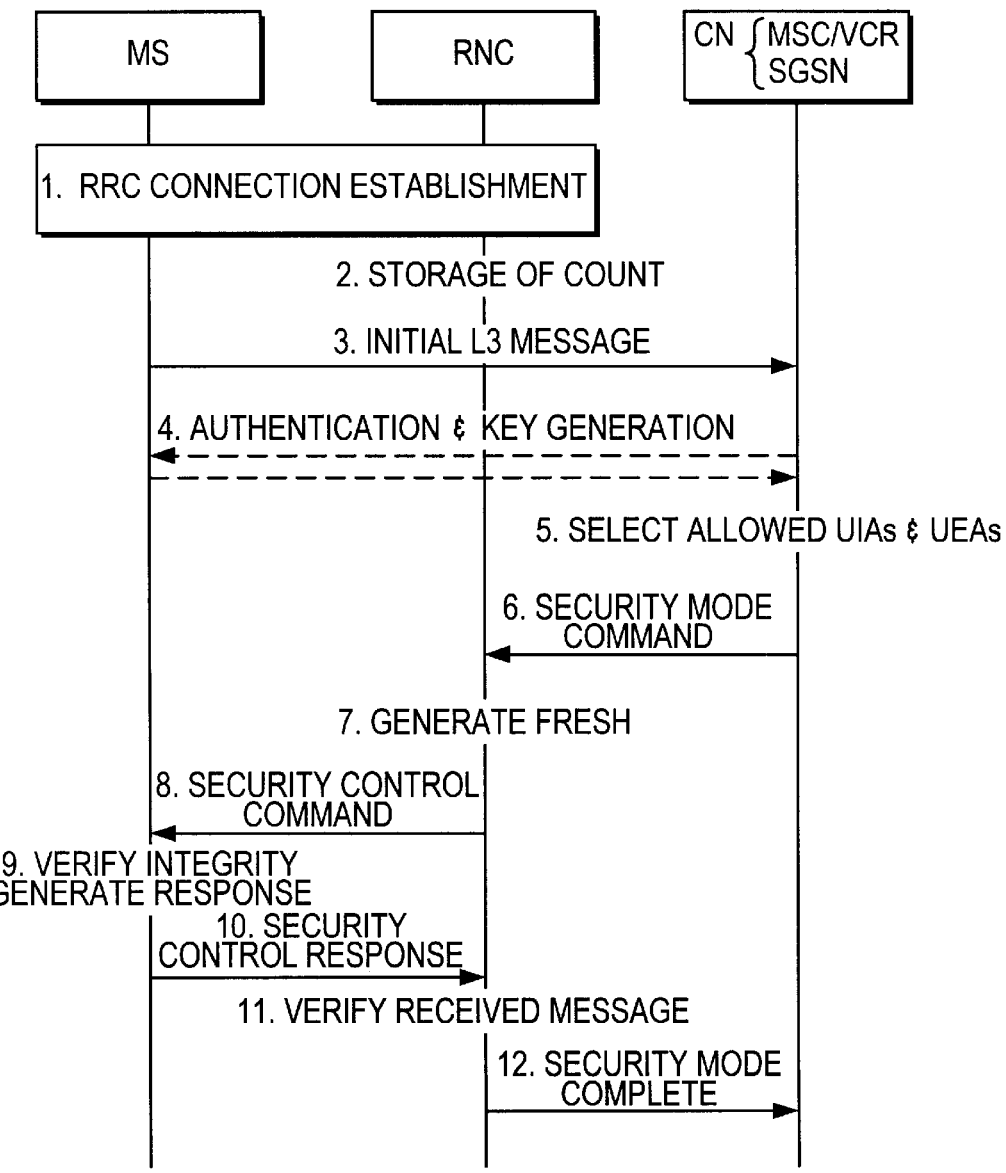
FIG. 5 is a signal flow diagram of an integrity check of a UMTS system.

Referring now also to FIG. 4, the CN performs the authentication procedure 140 as follows: This authentication step may comprise receiving a challenge and a result from the AuC, step 142. The challenge message may include the security parameters generated in step 130 if new security parameters were generated. The CN transmits the challenge to the MS, step 150. In response to the challenge, the MS must use a unique identifier known to the MS and apply it to an algorithm to produce a result, step 160. The results of the challenge generated by the MS are transmitted from the MS to the CN, step 170, and the CN compares the result from the MS to the result from the AuC, step 180. If the results match, the CN sends an acknowledgement to the RNC, step 190, via a "Security Mode Command" message. The "Security Mode Command" message includes any new security parameters generated during authentication for updating the RNC and possibly a new UIA and or UEA. If the MS is not authenticated, i.e. the results do not match, the CN sends an "authentication reject" to the MS, step 200. The authentication failure is indicated to the RNC via a response to the Request Security Check, step 190. However, as the MS was not the valid MS, the parameters related to the valid user are not erased in the RNC.

After performing the above procedure, the system may attempt the procedure in which the communication failure occurred.

The invention is not limited by the embodiments described above which are presented as examples only but can be modified in various ways within the scope of protection defined by the appended claims.

What is claimed is:

1. A security procedure for use with a mobile communication service in a mobile communication system having a core network connected to a plurality of radio access networks respectively providing radio coverage over radio access network areas, each of the plural radio access networks having a radio network controller and a base station, said security procedure comprising the steps of:
   (a) detecting, by a radio network controller a communication failure between the radio network controller and a mobile station, the radio network controller controlling radio coverage in a radio access network area in which the mobile station is located;
   (b) transmitting a request from the radio network controller to the core network to perform an authentication of the mobile station; and
   (c) performing a mobile station authentication procedure between the core network and the mobile station.

2. The security procedure of claim 1, wherein said step (b) further comprises the step of determining whether the communication failure detected in step (a) requires mobile station authentication and said step (c) further comprises performing the mobile station authentication procedure if it is determined that mobile station authentication is required.

3. The security procedure of claim 1, wherein said step (b) further comprises transmitting an indication of a cause of the communication failure detected in said step (a).

4. The security procedure of claim 1, wherein said step (c) further comprises the steps:
   (i) performing the authentication using an existing integrity algorithm by the core network and the mobile station after the core network receives the request from the radio network controller;
   (ii) determining whether the mobile station is authenticated by the core network after step (i); and (iii) sending an acknowledgement from the core network to the radio network controller if it is determined in step (ii) that the authentication was successful.

5. The security procedure of claim 4, wherein said step (iii) comprises sending an acknowledgement including new security parameters to the radio network controller.

6. The security procedure of claim 2, wherein said step (c) further comprises the steps:
(i) performing the authentication by the core network and the mobile station after the core network receives the request from the radio network controller,
(ii) determining whether the mobile station is authenticated by the core network after step (i); and
(iii) sending an acknowledgement from the core network to the radio network controller if it is determined in step (ii) that the authentication was successful.

7. The security procedure of claim 6, wherein said step (iii) comprises sending an acknowledgement including new security parameters to the radio network controller.

8. The security procedure of claim 1, wherein said step (c) further comprises the steps:
(i) performing the authentication by the core network and the mobile station after the core network receives the request from the radio network controller;
(ii) determining whether the mobile station is authenticated by the core network after step (i); and
(iii) sending an acknowledgement from the core network to the radio network controller if it is determined in step (ii) that the authentication was not successful.

9. The security procedure of claim 4, wherein step (i) comprises independently running an authenticating algorithm in an authorization center and in the mobile station and generating an output for each, and said step (ii) comprises comparing the two outputs in the core network.

10. The security procedure of claim 1, further comprising the steps of:
(i) contacting an authentication center of the mobile station and generating new security parameters between said steps (b) and (c); and
(ii) updating the radio network controller with the new security parameters after said step (c).

11. The security procedure of claim 4, wherein said step (iii) comprises sending an acknowledgement including a new integrity algorithm to the radio network controller.

12. The security procedure of claim 4, wherein said step (iii) comprises sending an acknowledgement including a new ciphering key to the radio network controller.

13. The security procedure of claim 4, wherein said step (iii) comprises sending an acknowledgement including a new integrity key to the radio network controller.

14. The security procedure of claim 1, wherein said step of detecting comprises determining whether the communication failure detected in step (a) resulted from a failed integrity check during a movement of the mobile station from one radio access network area to another.

15. The security procedure of claim 1, further comprising the steps of determining that a new integrity key or a new ciphering key is required when the integrity key or ciphering key stored in the mobile station does not match the integrity key or ciphering key stored in the radio network controller before said step (c).

16. The security procedure of claim 1, wherein the mobile communication service comprises a universal mobile telephone service.

17. A security procedure for use with a mobile communication service in a mobile communication system having a core network connected to a plurality of radio access network respectively providing radio coverage over radio access network areas, each of the plural radio access networks having a radio network controller and a base station, said security procedure comprising the steps of:
(a) detecting, by the radio network controller, a communication failure between the radio network controller and a mobile station, the radio network controller controlling a radio access network area in which the mobile station is located;
(b) transmitting a request from the radio network controller to the core network to perform an authentication of the mobile station and to change an encryption key;
(c) contacting a database of the mobile station and generating an encryption key by the core network simultaneously with step (b);
(d) performing the authentication by the core network after the core network receives the request from the radio network controller;
(e) determining whether the mobile station is authenticated by the core network after step (c); and
(f) replacing an old encryption key in the radio network controller and the mobile station with the encryption key generated in said step (c) if it is determined in step (e) that the mobile station was authenticated.

18. The security procedure of claim 17, wherein said step (d) further comprises the steps:
(i) transmitting a challenge from the core network to the mobile station;
(ii) performing the challenge using an authenticating algorithm in an authentication center and in the mobile station and generating an output for each;
(iii) determining whether the authentication of step (ii) was successful by comparing the outputs generated by the authentication center and the mobile station; and
(iv) sending an acknowledgement from the core network to the radio network controller if it is determined in step (ii) that the authentication was successful.

19. The security procedure of claim 17, wherein step (f) further comprises replacing the old encryption key stored in the database with the encryption key generated in said step (c).

20. The security procedure of claim 17, wherein said encryption key generated in said step (c) comprises a ciphering key.

21. The security procedure of claim 18, wherein said encryption key generated in said step (c) comprises an integrity key.

22. The security procedure of claim 17, wherein the mobile communication service comprises a universal mobile telephone service.

23. The security procedure of claim 17, wherein the database of step (c) comprises a home location register and said step (c) comprises contacting the home location register of the mobile station.

24. A mobile communication system, comprising:
a core network;
a plurality of radio access networks respectively providing radio coverage over radio access network areas, each of said plural radio access networks being connected to said core network and having a radio network controller and a base station;
means for detecting, by one of said radio network controllers, a communication failure between said one of said radio network controllers and a mobile station located in a universal radio access network area controlled by said one of said radio network controllers;

means for transmitting a request from said one of said radio network controllers to said core network to perform an authentication of the mobile station and to change a security parameter in response to said means for detecting;

means for authenticating the mobile station by the core network in response to a request to authenticate the mobile station received from said one of said radio network controllers;

means for setting a new security parameter by the core network in response to a request for a security parameter change received from said one of said radio network controllers;

means for replacing an existing security parameter stored in said one of said radio network controllers and mobile station with the new security parameter; and means for detaching, by the core network, the mobile station from said one of said radio network controllers if the mobile station was not successfully authenticated by said means for authenticating.

25. The system of claim 24, wherein said mobile station comprises a mobile telephone and said means for detecting a communication failure comprises means for detecting a communication failure between one of said radio network controllers and a mobile telephone.

26. The system of claim 24, wherein said security parameter comprises a ciphering key.

27. The system of claim 24, wherein said security parameter comprises an integrity key.

28. The system of claim 24, wherein said security parameter comprises one of a integrity algorithm and an encryption algorithm.

29. The system of claim 24, further comprising an authentication center, wherein said means for authenticating further comprises means for separately performing an authentication algorithm and generating an output at said authentication center and at said mobile station and comparing the outputs of said mobile station and said authentication center.

30. The system of claim 24, wherein said communication system is for use with a universal mobile telephone service.

31. In a mobile communication system having a core network, a plurality of radio access networks connected to the core network, and a mobile station, each of said plural radio access networks providing radio coverage over a radio access network area and having a radio network controller and a base station, the radio network controller storing a security parameter for use during communication between the radio network controller and the mobile station, the core network comprising:

means for authenticating the mobile station in response to receiving a request to authenticate the mobile station by transmitting an authentication challenge to the mobile station, receiving a result of the authentication challenge from the mobile station, and comparing the result to a required result to authenticate the mobile station, the request to authenticate being initiated by the radio network controller in response to detection by the radio network controller of a security operation failure which prevents communication between the mobile station and the core network;

means for setting a new security parameter in response to receiving a request for a security parameter change;

means for replacing the existing security parameter stored in the radio network controller and the mobile station with the new security parameter if the mobile station is successfully authenticated; and means for detaching the mobile station from said radio network controller if the mobile station was not successfully authenticated by said means for authenticating.

32. The core network of claim 31, wherein said security parameter comprises a ciphering key.

33. The core network of claim 31, wherein said security parameter comprises an integrity key.

34. The core network of claim 31, wherein said security parameter comprises one of a integrity algorithm and an encryption algorithm.

35. The core network of claim 31, further comprising an authentication center, wherein said means for authenticating further comprises means for separately performing an authentication algorithm at said authentication center and generating the required result and means for comparing the result generated by the mobile station to the required result generated by said authentication center.

36. The core network of claim 31, wherein said core network comprises a universal core network for use with a universal mobile telephone service.

37. In a mobile communication system having a mobile station and a plurality of radio access networks connected to a core network, each of the plural radio access networks respectively providing radio coverage over a radio access network area and comprising:

a radio network controller having a stored security parameter for use during communication between said each of the plural radio access networks with the mobile station;

a base station;

means, in said radio network controller, for detecting a communication failure between said radio network controller and a mobile station located in a universal radio access network area controlled by said radio network controller;

means for transmitting a request from said radio network controller to the core network to perform an authentication of the mobile station and to change a security parameter in response to a detection of a communication failure by said means for detecting;

means for passing an authentication challenge command from the core network to the mobile station;

means for passing a result of the authentication challenge from the mobile station to the core network; and means for receiving a new security parameter from the core network after the core network performs the authentication.

38. The radio access network of claim 37, wherein said security parameter comprises a ciphering key.

39. The radio access network of claim 37, wherein said security parameter comprises an integrity key.

40. The radio access network of claim 37, wherein said security parameter comprises one of a integrity algorithm and an encryption algorithm.

41. The radio access network of claim 37, wherein said radio access network comprises a universal radio access network for use with a universal mobile telephone service.

42. In a mobile communication system having a core network, a plurality of radio access networks respectively providing radio coverage over radio access network areas, each said plural radio access network connected to core network and having a radio network controller and a base station, a mobile station comprising:

a database having a unique identifier of the mobile station and an authentication algorithm stored therein;

means for receiving an authentication challenge command from said core network via a radio access network after a communication failure between said mobile station and the radio access network due to a security operation failure is detected by the radio network controller, said authentication challenge containing a command to perform the authentication algorithm using the unique identifier in the mobile station database to generate a result;

means for performing the authentication challenge using the authentication algorithm and the unique identifier in response to receiving the authentication challenge and generating the result of the authentication challenge; and means for transmitting the result of the authentication challenge to the core network via the radio access network for authentication of the mobile station by the core network.

43. The mobile station of claim 42, wherein said mobile station comprises a universal mobile station for use with a universal mobile telephone service.

* * * * *